United States Patent
Rojas

(10) Patent No.: US 9,961,949 B2
(45) Date of Patent: May 8, 2018

(54) ANIMAL CARRIER

(71) Applicant: Nancy M. Rojas, Ormond Beach, FL (US)

(72) Inventor: Nancy M. Rojas, Ormond Beach, FL (US)

(*) Notice: Subject to any disclaimer, the term of this patent is extended or adjusted under 35 U.S.C. 154(b) by 0 days. days.

(21) Appl. No.: 15/705,189

(22) Filed: Sep. 14, 2017

(65) Prior Publication Data
US 2018/0000175 A1    Jan. 4, 2018

Related U.S. Application Data

(63) Continuation-in-part of application No. 14/756,346, filed on Feb. 10, 2015.

(51) Int. Cl.
| | | |
|---|---|---|
| A01K 1/02 | (2006.01) | |
| A41D 15/04 | (2006.01) | |
| A01K 1/00 | (2006.01) | |
| A01K 1/015 | (2006.01) | |
| A41D 27/24 | (2006.01) | |
| A41D 27/10 | (2006.01) | |
| A41D 3/00 | (2006.01) | |

(52) U.S. Cl.
CPC ............ *A41D 15/04* (2013.01); *A01K 1/0035* (2013.01); *A01K 1/0157* (2013.01); *A41D 3/00* (2013.01); *A41D 27/10* (2013.01); *A41D 27/24* (2013.01); *A41D 2200/20* (2013.01); *A41D 2300/322* (2013.01)

(58) Field of Classification Search
CPC .... A01K 29/00; A01K 27/002; A01K 1/0035; A01K 1/02; A41D 15/04
See application file for complete search history.

(56) References Cited

U.S. PATENT DOCUMENTS

| | | | | |
|---|---|---|---|---|
| 4,307,470 A * | 12/1981 | Ezell | ........................ | A41D 3/00 2/108 |
| D370,090 S * | 5/1996 | Coggins | ........................ | 224/160 |
| 7,296,303 B1 * | 11/2007 | Samet | .................... | A01K 1/029 119/496 |
| 7,926,448 B2 * | 4/2011 | Fox | ........................ | A01K 1/029 119/497 |
| 2002/0124808 A1 * | 9/2002 | Zampelli | ............... | A01K 1/0254 119/497 |
| 2006/0005294 A1 * | 1/2006 | Fugazzi | ................. | A01K 1/029 2/115 |
| 2007/0278264 A1 * | 12/2007 | Chesal | ................. | A47D 13/025 224/160 |

OTHER PUBLICATIONS https://www.youtube.com/watch?v=VB0qdUkKACQ ; DIY sweatshirts into bags; animlove97; Jul. 11, 2011, 1 page. (Year: 2011).*

* cited by examiner

*Primary Examiner* — Monica L Williams
(74) *Attorney, Agent, or Firm* — US IP Services, P.C.; Timothy Marc Shropshire; Eric Brandon Lovell

(57) ABSTRACT

A carrier for transporting an animal is constructed from a hoodie jacket manipulated into a cross-body, i.e., sling-style, outer bag for carrying small animals. The jacket's sleeves are joined to one another to create a shoulder strap. Preferably, the jacket has two sewn-in front pockets and a full-front pull zipper that extends from the bottom of the jacket to the neck aperture. The carrier has a separate, removable sleep bag to provide additional comfort to the animal and ease entry and exit of the animal into and out of the carrier.

8 Claims, 4 Drawing Sheets

ANIMAL CARRIER

CROSS-REFERENCE TO RELATED APPLICATION(S)

The present application is a continuation-in-part of, and claims priority to, United States nonprovisional utility patent application Ser. No. 14/756,346 filed on Feb. 10, 2015, entitled "Joeysack", the entire disclosure of which is incorporated by reference herein.

BACKGROUND OF THE INVENTION

Field of Invention

The present invention relates to portable carriers for small animals.

Description of Related Art

Currently, animal carriers are bulky, cumbersome or difficult to use, expensive, uncomfortable for the animal and/or the handler, and/or are integrated into an article of clothing in such a way that would make the clothing undesirable for wear when not used as a carrier. For example, some animal carriers make the animal feel trapped, while others are designed such that the animal is secured inside a net with its feet dangling in the air. Examples of current animal carriers are US20060005294A1 (Fugazzi), U.S. Pat. No. 4,307,470A (Ezell), US20020124808A1 (Zampelli et al.), U.S. Pat. No. 7,296,303B1 (Samet), Hoodie Origami (fold your hoodie into a baby carrier), Sweatshirt tote (Fun family crafts), and Marbles (how to make a dog sling out of a shirt).

The present invention addresses the deficiencies of the prior art by making the animal feel comfortable and safe, and provides personal space for the animal to be transferred from home to other places. By constructing the animal carrier as described and utilizing a sleep bag as described herein, the carrier forms a unique way to provide what many other animal carriers do not. Further, unlike other similar carriers, the present invention does not require a handler to change his/her clothing to carry an animal.

The present invention incorporates fashion and marries it to function in a very unique and nonobvious manner. The design allows handlers to carry small animals in a safe and comfortable way for both the animal and the handler.

SUMMARY OF THE INVENTION

In an embodiment, the carrier is constructed from a hoodie jacket manipulated into a cross-body, i.e., sling-style, outer bag for carrying small animals. The jacket's sleeves are joined to one another to create a shoulder strap. Preferably, the jacket has two sewn-in front pockets and a full front pull zipper, extending from the bottom of the jacket to the neck aperture. The zipper is preferably a locking zipper, allowing it to be locked at a desired height. In use, the bottom of the jacket is closed to form a closed-bottom carrier. The jacket is preferably constructed using a material having a high content of cotton blended with a low content of spandex or polyester. The hood of the jacket serves as a cover for the animal when placed in the carrier, providing security and/or shelter. Additionally, the hood allows the animal to be undetected when so desired by the handler.

In an embodiment, the sleeves are permanently attached to one another via stitching. The cuff of one sleeve is inserted into the cuff of the other sleeve. Once inserted, the sleeves are stitched to one another to irreleasably bond them together, thus forming the shoulder strap.

In an embodiment, the sleeves are releasably attached to one another using a non-permanent fastener, such as VELCRO®, clips, hook and loop, or any combination thereof. One component of the fastener(s), e.g., the male or female component, is affixed to the interior of one of the sleeves, and the mating component is affixed to the interior of the other sleeve. The sleeves are joined to form the shoulder strap by inserting the cuff of one sleeve through the cuff of the other sleeve and connecting the mated, or corresponding, fastener components to one another. The shoulder strap is then disassembled into the respective sleeves by disengaging the mated fastener components from one another and removing the one sleeve from the other.

In an embodiment, the bottom, i.e., waistline, of the jacket is permanently closed via stitching to form a closed bottom bag that completely unzips from the top, i.e., the neck aperture, to the bottom.

In an alternative embodiment, one or more releasable fasteners, such as VELCRO®, buttons and corresponding button holes, mated snaps, a zipper, or any combination thereof, is/are positioned along an inside of the waistline. One component, e.g., a male or female component, of the fastener(s) is affixed to the interior of the waistline, either i) along the right-hand side of the jacket, i.e., extending from the front zipper to the rear midpoint of the jacket, or ii) extending along a rear of the waistline from a right-hand midpoint of the waistline to a left-hand midpoint of the waistline, or vice versa. Similarly, the mating component is affixed to the interior of the waistline, to correspond with its mated component, i.e., either i) along the left-hand side of the jacket, i.e., extending from the front zipper to the rear midpoint of the jacket, or ii) extending along a front of the waistline from a right-hand midpoint of the waistline to a left-hand midpoint of the waistline, or vice versa. By connecting the mated fastener components to one another (and joining the sleeves to one another as described herein), the jacket becomes a closed-bottom, sling-style carrier. Similarly, by disengaging the respective mated fastener components from one another, the carrier transforms back into a jacket for use by the handler. Thus, the use of temporary fasteners allows the wearer/handler to easily and quickly transform the jacket into an animal carrier, and vice versa.

The rear midpoint of the waistline should be interpreted herein as the midpoint of the waistline circumference as measured from the front zipper. Likewise, the right- and left-hand midpoints of the waistline should be interpreted herein as the midpoint between the front zipper and the rear midpoint along the right- and left-hand sides of the waistline, respectively.

In an embodiment, the carrier has a separate sleep bag/insert to ease entry and exit of the animal into and out of the carrier. In an embodiment, the sleep insert is made of thick quilted and batted cotton fabric to provide a reinforced skeletal structure to the sleep bag and carrier. The sleep bag may be easily added or removed from the carrier for additional comfort, security and transportability.

In an embodiment, a tether, i.e., netting or an elasticized restraint device, is attached to anchor points on an exterior surface of the carrier for stowage of personal items. In a further or alternative embodiment, a collapsible water bowl is attached to an anchor point on the exterior surface of the carrier.

By constructing both components of the animal carrier as described and placing the sleep bag into the carrier as directed, the carrier forms a unique way to provide comfort for the animal in a manner that many other animal carriers do not. The present invention is a re-purposed hoodie and an inner sleep bag either lightly stuffed or not stuffed to provide stability when worn. The inner sleep bag also serves a second purpose as it may be used as the animal's bed at home or away from home thus limiting stress of new smells and environments.

The carrier allows the animal to be transported in and out of public establishments, such as retail spaces. Likewise, the carrier allows the handler to be accompanied by his/her animal companion on trips such as air travel providing therapy/anxiety relief to the handler. Recreational endeavors with animals are also made easy using the animal carrier. For example, handlers can ride a bike or take walks all the while comfortably wearing the carrier with minimal additional stress factors to the handler and/or the animal.

The animal carrier is designed to be hands-free and comfortable for handlers on-the-go, for example, during air travel. Additionally, the carrier is designed to allow persons with ADA-qualified emotional illness to enter social settings through the comfort of having their stress relief companion with them. The carrier provides privacy and comfort to reduce stress for both the animal and wearer. Similarly, the animal carrier is designed to be used as a therapy carrier for the animal during a stressful period, such as entry into an animal shelter, rescue from abandonment, surgery or any other stressful event.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
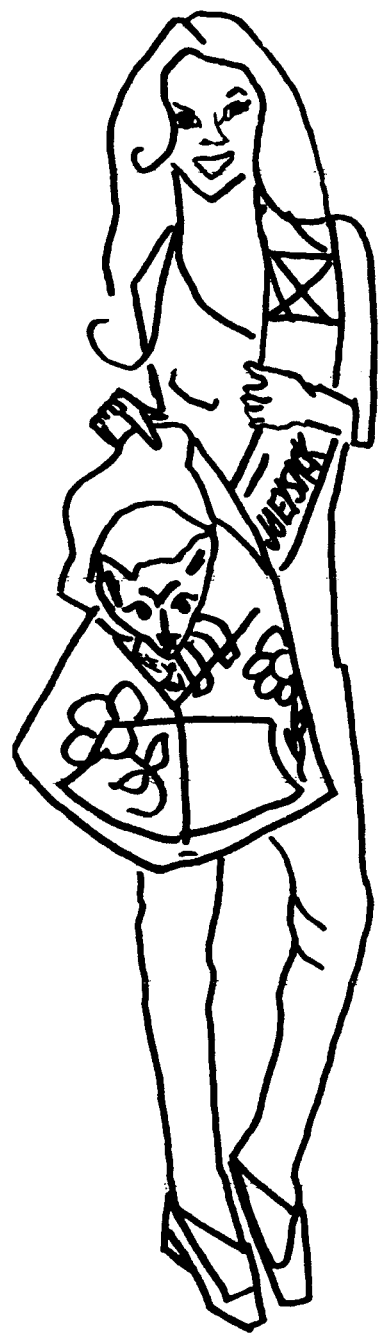
FIG. 1. shows the animal carrier worn with an animal inserted.
Figure 2:
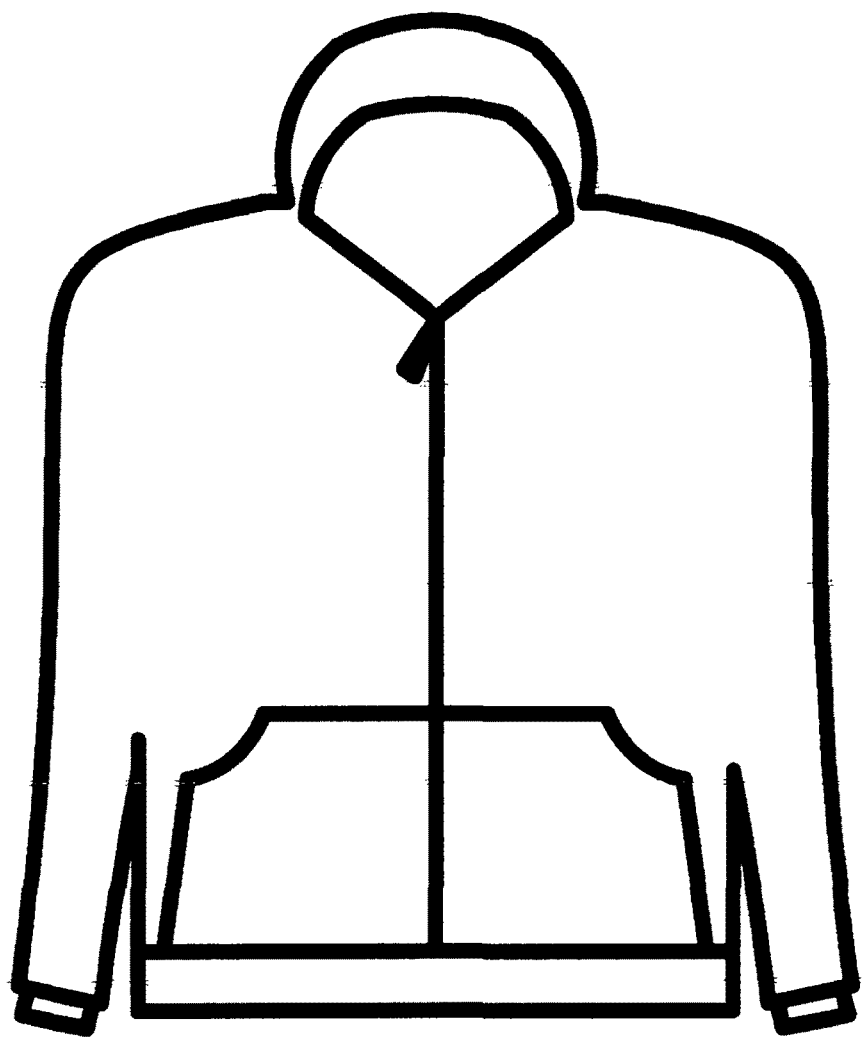
FIG. 2. shows a hoodie jacket having a hood, pockets, and long sleeves prior to conversion to the animal carrier.
Figure 3:
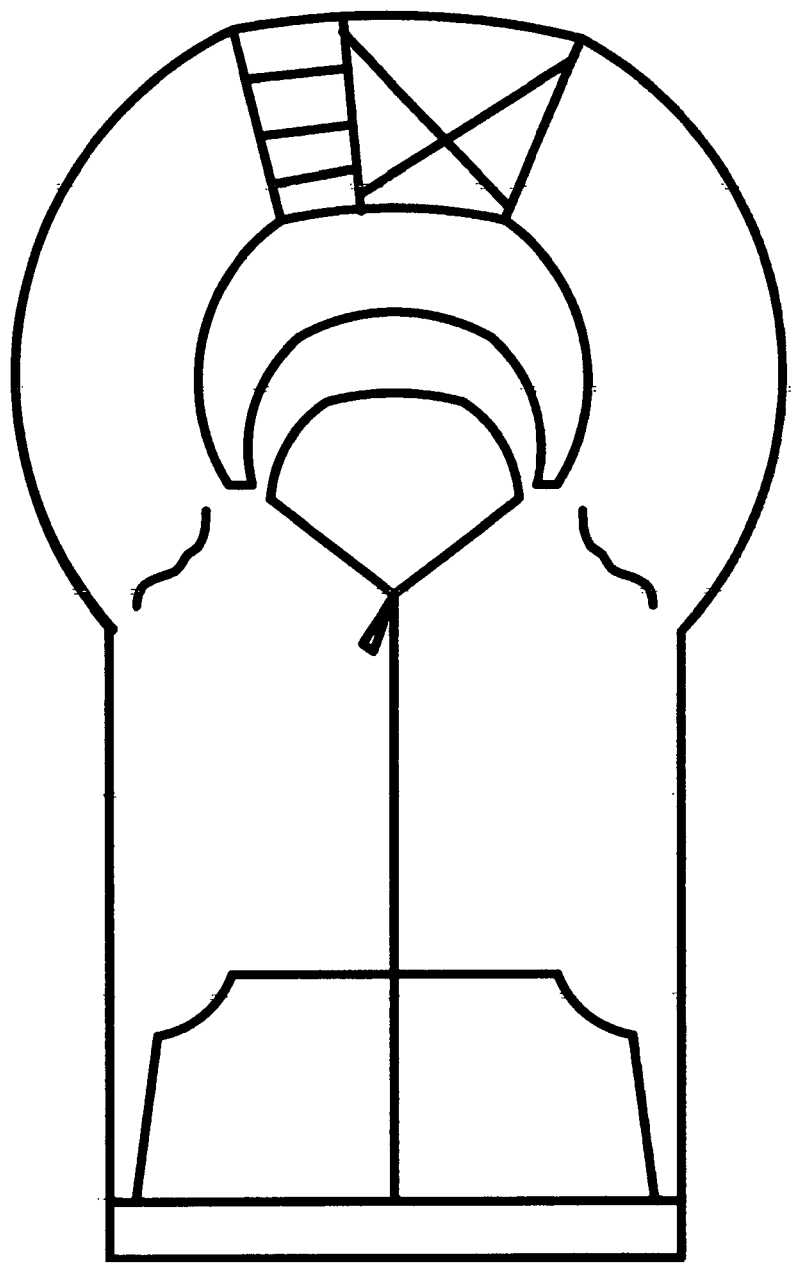
FIG. 3. shows reinforcements and adjustments to jacket required for conversion to the animal carrier.

Preferred embodiments of the present invention and their advantages may be understood by referring to FIGS. 1-6 wherein like reference numerals refer to like elements.

Referring to FIGS. 1-6, the animal carrier is worn over-shoulder as a cross-body garment. However, the user may also wear it on his/her back or front if preferred. The carrier is constructed from a hoodie jacket having a full-front zipper that bisects the front of the jacket, a hood, and long sleeves. Additionally, in the preferred embodiment, the waistline and sleeve cuffs are constructed using elasticized stretch bands. The hood is very important, as it provides added protection, concealment, and security for the animal. Additionally, it allows tactile interaction, while maintaining concealment of the animal, between the handler and the animal as may be needed for the handler and/or the animal requiring emotional support.

Fabric quality plays an important role as the jacket must have structure as well as quality. Preferably, the jacket is constructed primarily of natural fibers with a small percentage of spandex or similar synthetic materials.

Figure 4:
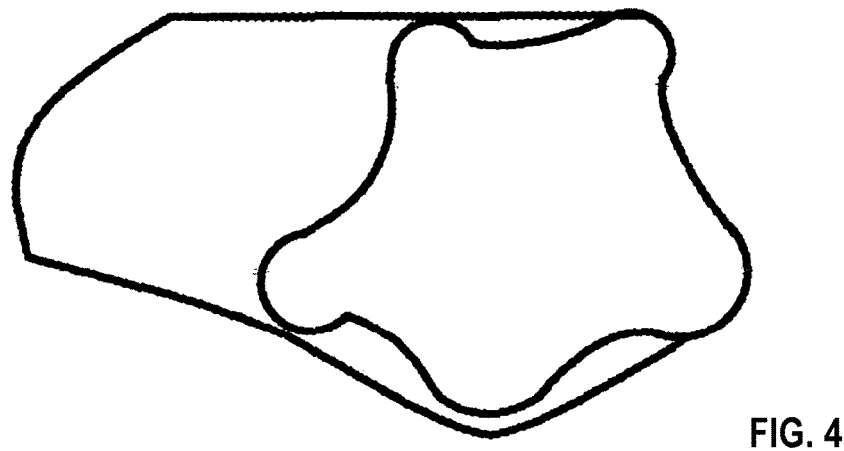
FIG. 4 shows the completed inner sleep bag.
Figure 5:
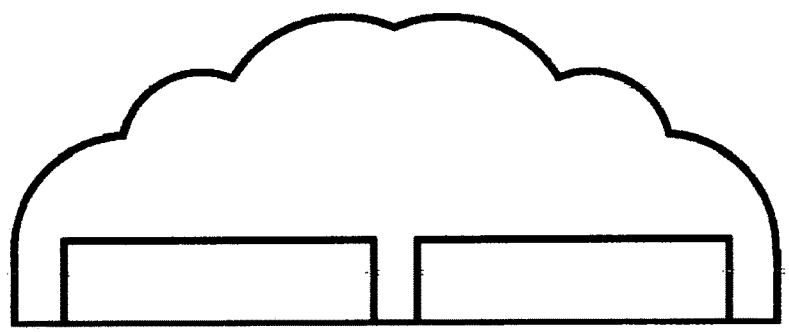
FIG. 5 shows the inner sleep bag prior to sewing using quilted fabric and two pillow pockets on inside.
Figure 6:
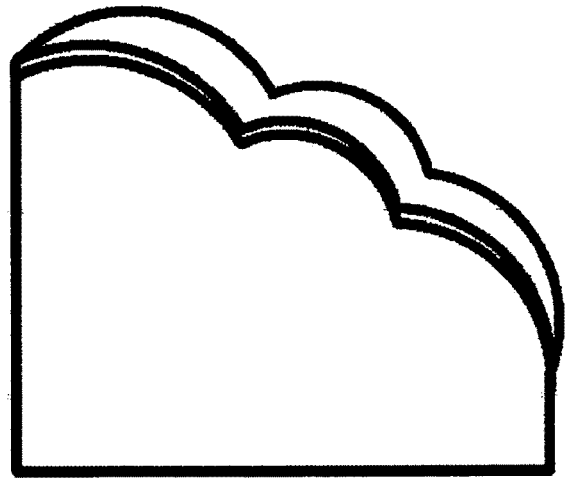
FIG. 6 shows the inner sleep bag as double sided quilted fabric with or without batting sewn in bias tape trim.

The animal carrier requires a removable inner sleep bag as shown in FIG. 4. The sleep bag can be used separately in an animal bed, human bed, or otherwise to provide a warm and comforting environment for the animal to sleep in. In a preferred embodiment, the sleep bag has scalloped edges. The scalloped edges allow easy entry into the inner sleep bag. Additionally, rectangular additions provide padded and fluff filled comfort for the animal. FIG. 6. provides a detailed outside interpretation scalloped edge.

In an embodiment, the carrier is constructed from a hoodie jacket manipulated into a cross-body, i.e., sling-style, outer bag for carrying small animals. The jacket's sleeves are joined to one another to create a shoulder strap. Preferably, the jacket has two sewn-in front pockets and a full front pull zipper, extending from the bottom of the jacket to the neck aperture. The zipper is preferably a locking zipper, allowing it to be locked at a desired height. In use, the bottom of the jacket is closed to form a closed-bottom carrier. The jacket is preferably constructed using a material having a high content of cotton blended with a low content of spandex or polyester. The hood of the jacket serves as a cover for the animal when placed in the carrier, providing security and/or shelter. Additionally, the hood allows the animal to be undetected when so desired by the handler.

In an embodiment, the hoodie jacket is permanently transformed into an animal carrier. In this embodiment, the sleeves are permanently attached to one another via stitching. The cuff of one sleeve is inserted into the cuff of the other sleeve. Once inserted, the sleeves are stitched to one another to irreleasably bond them together, thus forming the shoulder strap. In a further embodiment, the overlapping portion of the sleeves is quilted and padded, e.g., with batting, to cushion the portion of the shoulder strap that engages the handler's shoulder during use. In addition to permanently stitching the sleeves to one another, the bottom, i.e., the waistline, of the jacket is permanently closed via stitching to form a closed-bottom bag that completely unzips from the top, i.e., the neck aperture, to the bottom.

In an alternative embodiment, the hoodie jacket is configured to readily convert to an animal carrier, and vice versa. In this embodiment, the sleeves are releasably attached to one another using a non-permanent fastener, such as VELCRO®, clips, hook and loop, or any combination thereof. One component of the fastener(s), e.g., the male or female component, is affixed to the interior of one of the sleeves, and the mating component is affixed to the interior of the other sleeve. The sleeves are joined to form the shoulder strap by inserting the cuff of one sleeve through the cuff of the other sleeve and connecting the mating, or corresponding, fastener components to one another. The shoulder strap is then disassembled into the respective sleeves by disengaging the mated fastener components from one another and removing the one sleeve from the other.

In addition to releasably joining the sleeves, one or more releasable fasteners, such as VELCRO®, buttons and corresponding button holes, mated snaps, a zipper, or any combination thereof, is/are positioned along an inside of the waistline. One component, e.g., a male or female component, of the fastener(s) is affixed to or, in the case of button holes, located on the interior of the waistline, either i) along the right-hand side of the jacket, i.e., extending from the front zipper to the rear midpoint of the jacket, or ii) extending along a rear of the waistline from a right-hand midpoint of the waistline to a left-hand midpoint of the waistline, or vice versa. Similarly, the mating component is affixed to or, in the case of button holes, located on the interior of the waistline, to correspond with its mated component, i.e., either i) along the left-hand side of the jacket, i.e., extending from the front zipper to the rear midpoint of the jacket, or ii) extending along a front of the waistline from a right-hand midpoint of the waistline to a left-hand midpoint of the waistline, or vice versa. By connecting the mated fastener components to one another (and releasably joining the sleeves to one another as described herein), the jacket becomes a closed-bottom, sling-style carrier. Similarly, by disengaging the sleeve and waistline fastener components, respectively, from one another, the carrier transforms back into a jacket for use by the handler. Thus, the use of temporary fasteners allows the wearer/handler to easily and quickly transform the jacket into an animal carrier, and vice versa.

The rear midpoint of the waistline should be interpreted herein as the midpoint of the waistline circumference as measured from the front zipper. Likewise, the right- and left-hand midpoints of the waistline should be interpreted herein as the midpoint between the front zipper and the rear midpoint along the right- and left-hand sides of the waistline, respectively.

In a further embodiment, the carrier has a separate sleep bag/insert to ease entry and exit of the animal into and out of the carrier. In an embodiment, the sleep insert is made of thick quilted and batted cotton fabric to provide a reinforced skeletal structure to the sleep bag and carrier. The sleep bag may be easily added or removed from the carrier for additional comfort, security and transportability.

In an embodiment, a tether, i.e., netting or an elasticized restraint device, is attached to anchor points on an exterior surface of the carrier for stowage of personal items. In a further or alternative embodiment, a collapsible water bowl is attached to an anchor point on the exterior surface of the carrier.

Method of Manufacture

A hoodie jacket having front pockets, full front zipper and hood is required. The following steps are used to manufacture the present invention.
  a) The seams joining the shoulder and sleeve are reinforced with thread in a zig-zag, elastic stitch, or similar stitch.
  b) The bottom, i.e., waistline, of jacket is sewn together, i.e., closed, using a straight stitch that extends from one side, i.e., right- or left-hand side, of the waistline to the other side. Preferably, the waistline is tucked into the jacket prior to stitching, allowing the straight stitch to be sewn on the interior of the jacket in a semi-circle from side to side to bring the base of the jacket to a rounded configuration, thus reducing bulk. The closed waistline is then further reinforced on the interior of the jacket with a zig-zag, elastic or similar stitch.
  c) One sleeve is twisted once, and is inserted into the other sleeve through its cuff to form the cross-body shoulder strap. Twisting the sleeve allows the shoulder strap to lie flat on the handler's body during use, thus providing enhanced comfort to the handler. Once inserted, the sleeves are cross-stitched to bond the sleeves together. Additionally, with reference to FIG. 3, in the preferred embodiment, the sleeves are reinforced using a rectangular stitch pattern in combination with an "X" stitch pattern sewn 4" long and the width of the sleeve. Reinforcement stitching or top stitch overlock is used at a side of the cuff for greater strength and integrity. The outer stretch band, i.e., cuff, is left free to fold or lie flat. This process provides a soft, padded strap for the handler and helps with weight distribution.
  d) The second component of the animal carrier is the inner sleep bag.
    a) The sleep bag contains an outer layer and a non-removable inner lining. Preferably, either the outer layer or the lining is constructed of a quilted and batted fabric for added comfort, stability, and structure.
    b) In a preferred embodiment, the top edges of the sleep bag are cut in a scalloped pattern. The scalloped pattern allows easy entry of the animal into the sleep bag.
    c) Once the patterns for the outer layer and the lining are cut, the outer layer and lining fabrics are stitched to one another to form the bag. Once the sleep bag is fully stitched, pockets are optionally stitched to an exterior surface of the outer layer. Additionally, the pockets can be quilted and padded.

Method of Use

Place the carrier in a cross-body position over the desired shoulder. The front zipper should be positioned away from the handler's body. At this point the inner sleep bag is outside of the carrier. Raise the hood and position it behind the carrier, or up on the handler's chest while inserting the animal. Position the zipper at a height to accommodate the size of the animal to be inserted. Preferably, the head of the animal, when in an upright position, should be visible when placed in the carrier. If the inner sleep bag is to be used, hold the animal so that it drops to the bottom of the sleep bag and cinch the top with your hand leaving only the animal's head showing. Lower the animal into the carrier, with or without the inner sleep bag. Once inserted, the carrier can be zipped all the way up to secure the animal. If desired, the hood can be placed forward, i.e., away from the handler, to further conceal the animal and provide protection from the elements, e.g., sun, rain, wind, or snow. The pockets can be used to store personal items, such as cell phones, wallets, waste bags, etc.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. An animal carrier comprising:
  a. a jacket comprising:
    i. a hood;
    ii. a first sleeve;
    iii. a second sleeve, wherein the first sleeve and the second sleeve are long sleeves; and
    iv. a zipper that bisects the front of the jacket, wherein the zipper extends from a neck of the jacket to a waistline of the jacket; and
  b. a removable inner sleep bag, wherein a first half of the waistline is joined to a second half of the waistline to form a closed-bottom bag, and wherein the first sleeve and the second sleeve are joined to one another to form a shoulder strap, wherein an overlapping portion of the first sleeve and the second sleeve is quilted and padded, wherein stitching used to join the first sleeve to the second sleeve comprises a rectangular stitch pattern in combination with an "X" stitch pattern sewn the width of the first sleeve, wherein the rectangular stitch pattern and the "X" stitch pattern are positioned along the overlapping portion of the first sleeve and the second sleeve, and wherein the first sleeve is twisted once prior to being inserted into the second sleeve.

2. The animal carrier of claim 1, wherein the zipper is a locking zipper.

3. The animal carrier of claim 1, wherein the inner sleep bag is padded and quilted.

4. The animal carrier of claim 1, wherein seams joining the first sleeve and the second sleeve to a shoulder portion of the jacket are reinforced with zig-zag stitching.

5. An animal carrier comprising:
   a. a jacket comprising:
      i. a hood;
      ii. a first sleeve;
      iii. a second sleeve, wherein the first sleeve and the second sleeve are long sleeves;
      iv. one or more first waistline fastener components extending along an interior surface of the first half of the waistline;
      v. one or more second waistline fastener components extending along an interior surface of a second half of the waistline, wherein the one or more first waistline fastener components matingly engage the one or more second waistline fastener components to releasably close the waistline to form a closed-bottom bag;
      vi. one or more first sleeve fastener components disposed within the first sleeve;
      vii. one or more second sleeve fastener components disposed within the second sleeve, wherein the one or more first sleeve fastener components matingly engage the one or more second sleeve fastener components to releasably join the sleeves to form a shoulder strap; and
      viii. a zipper that bisects the front of the jacket, wherein the zipper extends from a neck of the jacket to a waistline of the jacket; and
   b. a removable inner sleep bag,
   wherein an overlapping portion of the first sleeve and the second sleeve is quilted and padded, and wherein the first sleeve is twisted once prior to being inserted into the second sleeve.

6. The animal carrier of claim 5, wherein the zipper is a locking zipper.

7. The animal carrier of claim 5, wherein the inner sleep bag is padded and quilted.

8. The animal carrier of claim 5, wherein seams joining the first sleeve and the second sleeve to a shoulder portion of the jacket are reinforced with zig-zag stitching.

* * * * *